United States Patent

[11] 3,614,201

| [72] | Inventors | Martin R. Biazzo<br>Holmdel;<br>Bernard G. King, Rumson, N.J.; William<br>C. G. Ortel, New York, N.Y. |
|---|---|---|
| [21] | Appl. No. | 780,347 |
| [22] | Filed | Dec. 2, 1968 |
| [45] | Patented | Oct. 19, 1971 |
| [73] | Assignee | Bell Telephone Laboratories, Incorporated<br>Murray Hill, Berkeley Heights, N.J. |

[54] ACOUSTICALLY ABSORBENT MOUNTING METHOD AND APPARATUS FOR OPTICAL MODULATOR
15 Claims, 4 Drawing Figs.

[52] U.S. Cl. .................................................. 350/160,
 350/161, 174/126, 310/8.2, 340/10, 73/69
[51] Int. Cl. ............................................................ G02f 1/28
[50] Field of Search .......................................... 350/160,
 161; 174/126; 310/8.2; 340/10; 73/69

[56] References Cited
UNITED STATES PATENTS

| 2,656,473 | 10/1953 | Warner | 310/8.2 |
| 3,320,578 | 5/1967 | Aherns et al. | 340/8 |
| 3,454,325 | 7/1969 | Ohm | 350/160 |
| 3,470,395 | 9/1969 | Moffatt | 310/8.1 |

Primary Examiner—Ronald L. Wibert
Assistant Examiner—T. Major
Attorneys—R. J. Guenther and Kenneth B. Hamlin

ABSTRACT: Acoustical ringing which results from piezoelectric effects in an electrooptical modulator is suppressed by mounting the modulator crystal between massive, acoustically absorbent, support members which also provide an electric circuit interface for applying electric signals to the modulator. Solder provides such an absorbent mounting for a lithium tantalate electrooptical modulator crystal. Both solder support members are flowed into place during the same heating interval and permitted to cool simultaneously.

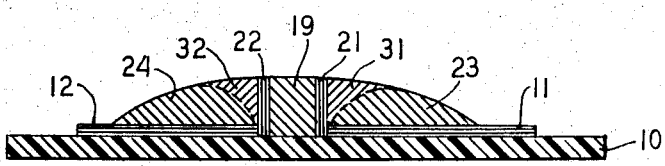
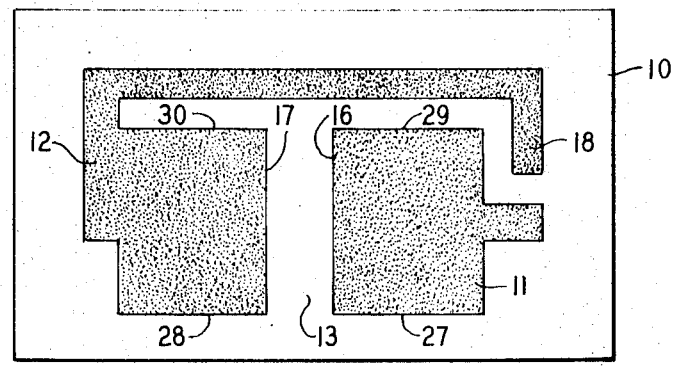
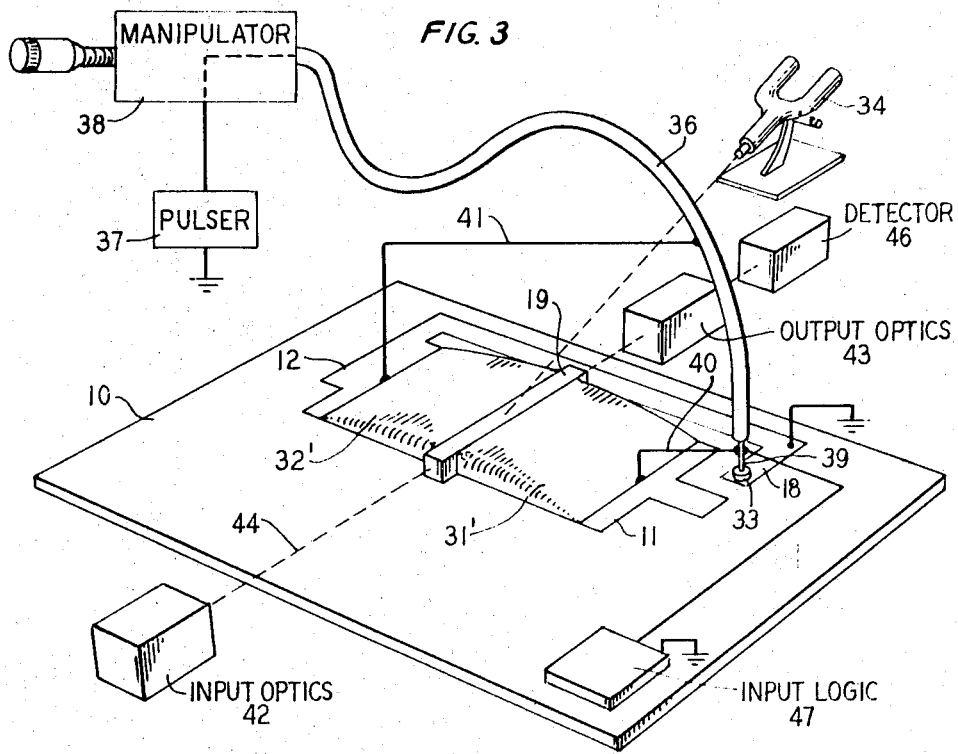
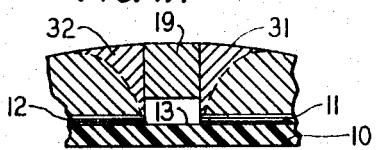
INVENTORS M. R. BIAZZO
B. G. KING
W. C. G. ORTEL
BY Charles Scott Phelan
ATTORNEY 3,614,201

ACOUSTICALLY ABSORBENT MOUNTING METHOD AND APPARATUS FOR OPTICAL MODULATOR

BACKGROUND OF THE INVENTION

1. Field of the Invention

This invention relates to mounting arrangements for optical modulator crystals, and it involves in particular a mounting method and apparatus for reducing mechanical vibrations produced in the modulator.

2. Description of the Prior Art

Ferroelectric modulators for electromagnetic radiation, e.g., radiation in the visible light range, respond optically to the desired electric field but also produce by piezoelectric action mechanical vibrations which are not desired. One example of such a modulator is an elongated crystal of lithium tantalate. A finite time interval is required after an applied voltage change for the vibrations to die out; and they have, therefore, come to be called "acoustical ringing." "Acoustical" is used here to distinguish, for example, electrical ringing and has reference to mechanical vibrations at any frequency, but typically at high frequencies such as 10 megahertz and well above the audible range. The vibrations can interfere with the desired signal modulation that is normally effected by rotation of polarization orientation for the radiation which is transmitted through the modulator. Undesirable piezoelectric effects are present at all frequencies at which the modulator is operated; but, as the modulating signal frequency increases, the ringing skirts which are added to the information bits begin to overlap adjacent bit intervals thereby causing intersymbol interference.

Previous efforts toward reducing the effects of the aforementioned acoustical ringing have taken a number of different forms. In each case there have remained significant frequency limitations which prevented useful operation in the gigaHertz frequency range that is necessary for efficient utilization of the bandwidth of the electromagnetic radiation in the light band. For example, attempts have been made to suppress the ringing by providing supplementary signals to cancel out the ringing effects. In another arrangement, a mechanical structure was provided to shift the frequency of mechanical vibrations in the modulator crystal to a frequency range which could be conveniently damped out by immersing the crystal in oil. Arrangements such as those heretofore found in prior art are complex and expensive, as well as in some cases requiring structures with such high capacitance that they cannot be usefully employed in the gigahertz frequency range. A measure of damping achieved by soldering a modulator crystal to the large mass of a copper heat sink has also been utilized in the prior art, but its operation was found to be unsatisfactory for ordinary modulation in the gigahertz frequency range.

It is, therefore, one object of the present invention to improve electro-optical modulators.

It is another object to suppress acoustical vibration in electro-optical modulators.

A still further object is to operate an electro-optical modulator in the gigahertz frequency range.

SUMMARY OF THE INVENTION

The aforementioned and other objects of the invention are realized in an illustrative embodiment in which a ferroelectric, electro-optical, modulator crystal is mounted between positioning members which restrain its mechanical movement and also provide electrical connection to the modulator. The interfaces for electrical and mechanical coupling between the crystal and each of those support members are similar and essentially uniform.

It is one feature of the invention that the support members for the modulator crystal have a mass which is much larger than the crystal mass.

Another feature is that the support members are highly absorbent for acoustical vibrations.

It is another feature that the electrical interface between the support members and the modulator crystal is extended across substantially the full area of the two faces of the crystal between which electric signals are applied.

A further feature of the invention is that the support members are formed and their electric and mechanical engagement with the modulator crystal is accomplished essentially simultaneously for the two support members so that the electrical interface is free of coupling imperfections that could permit localized sustained vibrations in the crystal.

A still further feature is that the modulator support members are formed of solder flowed into place along the modulator under the same heat conditions and under microscopic monitoring of the formation of the support members for detecting and eliminating interfacial imperfections.

BRIEF DESCRIPTION OF THE DRAWINGS

A more complete understanding of the invention and its various features, objects, and advantages may be obtained from a consideration of the following detailed description in connection with the appended claims and the attached drawing in which:

FIG. 1 is a sectional view in elevation of a modulator mounting arrangement in accordance with one aspect of the invention;

FIG. 1A is a partial sectional view in elevation of a modified form of the embodiment of FIG. 1;

FIG. 2 is a partial top view of the structure in FIG. 1 with some of the elements removed; and FIG. 3 is a perspective view of the mounting arrangement in FIG. 1 in a simplified optical modulation system.

DETAILED DESCRIPTION

In FIG. 1 a glass substrate 10 has thin film metallic contact areas 11 and 12 deposited thereon. Although an object is to suppress acoustical vibrations and glass is an acoustically live material, modulator positioning means that are acoustically dead will be described for use in conjunction with the glass to combine the advantages of a high acoustical damping constant and thin film circuit technology. The mentioned contact areas and other elements in FIG. 1 are shown in exaggerated proportion in order that their arrangement with respect to one another may more readily be appreciated. Each of the contact areas 11 and 12 is made up of several laminations. A conventional thin film circuitry substrate of glass with a layer of tantalum oxide covered in succession by tantalum oxide, tantalum nitride, and gold layers is photoetched to obtain gold contact areas in the desired pattern and interconnecting tantalum nitride resistors as needed for the resulting circuits. A copper film is then electroplated onto the gold contact areas and tinned. The resulting contact area pattern for the illustrated embodiment is shown in the partial top view of FIG. 2. A solder with a melting point of 95° C. is advantageously employed for the tinning and includes by weight, 16 percent tin, 32 percent lead, and 52 percent bismuth.

A space 13 is left clear of gold and tantalum nitride between the edges 16 and 17, and all around contact areas 11 and 12, of the contact areas 11 and 12, respectively, so that there is no electrical connection therebetween as shown in FIG. 2. The space between edges 16 and 17 is equal to the width of a modulator crystal 19 with its contacts 21 and 22, and the modulator crystal will be subsequently placed in that space as hereinafter described. A part of the contact area 12 extends around the top of the substrate 10 as shown in FIG. 2 to provide a contact portion 18, which is close to the contact area 11, for facilitating electrical connection to both contact areas 11 and 12 while at the same time permitting a semiconductor driver to be connected electrically in parallel with the modulator as described in the copending application Ser. No. 780,346 of B. G. King and R. P. Reisz entitled "Gunn Effect Driver For Optical Modulators," assigned to the same assignee as the present application, and concurrently filed herewith.

A structure which is both acoustically absorbent and massive, by comparison to the mass of electro-optical modulator crystal 19, is utilized to provide electrical connection between the aforementioned contact areas and the side of the crystal. Such structure also provides firm support for the crystal to position it in its appointed location in the space 13 between contact areas 11 and 12. Solder was selected for the massive absorbent support and connecting structure because it is electrically conductive and because it has an acoustical impedance which is essentially compatible with the acoustical impedances of modulator crystals such as lithium tantalate and has a high acoustical loss, i.e., a high acoustical damping constant. The acoustical impedance match for solder is not perfect, but it is among the better electrical conductor materials which showed satisfactory impedance compatibility and absorption. Furthermore, solder is inexpensive, easily worked, and commercially available in different alloys with different melting points and different acoustic impedances. All of these characteristics yield improved performance over prior art arrangements and facilitate construction as will hereinafter be described. Electro-optical modulators such as lithium tantalate have modulation characteristics that are to some extent thermally sensitive. The structure herein described operates satisfactorily for some applications with the solder providing adequate heat sink function. In other applications additional thermal control apparatus, e.g., an oven control or a supplemental copper heat sink, may be provided in accordance with well-known techniques.

It is further necessary in order to achieve satisfactory acoustical damping for high-frequency operation that the mechanical interface between the modulator and its support structure extend over substantially the full area of the crystal faces between which the electric field is applied. Electrical contact to the modulator is made through the support structure and utilizes the mechanical interface to advantage for establishing electric field uniformity through the modulator. That interface must be free of any imperfections that could permit the crystal to ring in even a minute localized region. It has been found that a small void at the interface or small foreign matter, such as lint, e.g., an imperfection with a dimension commensurate to the height of the crystal 19 as shown in FIG. 1, will permit objectionable ringing. Such interface criteria are advantageously achieved by applying contact films 21 and 22 to two crystal faces and flowing molten solder into the spaces partially defined by the substrate contact areas 11 and 12 and the modulator contact films 21 and 22. The solder masses so positioned have a roughly triangular, or tapered, cross section as illustrated in FIG. 1. The direction of the taper is away from either side of crystal 19 and perpendicular to the length, i.e., the optical path in the crystal.

The contact films 21 and 22 are formed of laminations. In this case each of the contact films 21 and 22 advantageously comprises laminations of chromium, copper, and gold which are evaporated in that order onto the modulator crystal faces that are perpendicular to the C-axis, i.e., the ferroelectric polar axis, of the crystal. Plural modulator crystals, such as the crystal 19, are preferably formed initially in a large wafer which is then plated on both sides with the chromium, copper, and gold to apply the contact film material. The plated wafer is then cut into rods, each of which comprises a modulator crystal such as the modulator 19. Consequently, there is no danger of evaporation overshoot onto the top or bottom surface of the crystal in the orientation shown in FIG. 1. During the plating operation and prior to cutting the wafer into rods, the wafer edges are masked to prevent evaporation overshoot onto the surfaces which constitute the end surfaces of the modulator rods. Such an end surface is parallel to the cross section face of crystal 19 illustrated in the plane of the drawing of FIG. 1. The result of the masking to achieve the elimination of evaporation overshoot is to leave a small, nonplated, guard zone at each end of the modulator rod. These end zones can be seen in exaggerated proportion in the perspective view of FIG. 3. In an actual structure, the end zones are of much shorter length than the total length of the modulator rod 19 so that there is no significant distortion of the electric field applied to the rod when it is operated as an electro-optical modulator.

In a preferred embodiment of the invention, major masses 23 and 24 of high melting temperature solder are applied to substrate contact areas 11 and 12, respectively, before the modulator rod 19 is placed on the substrate. One solder which is suitable for this purpose has a melting point of about 188° C. and comprises by weight approximately 50 percent each of lead and tin. The major masses 23 and 24 of solder are applied before the modulator is assembled so that the bulk of the support structure can be established in position and in electrical contact with the contact areas 11 and 12 thereby correspondingly reducing the amount of time that the substrate and crystal contact areas, and the modulator crystal 19 must be held under high-temperature conditions for final assembly.

Solder masses 23 and 24 are applied in molten form by heating the entire substrate assembly by heating means not shown; and melting the solder on contact with the assembly. The extent of the deposits on the contact areas is edge-limited by the edges of the tinned contact areas on two sides. Thus, the edges 27, 28, 29, and 30 limit the extent of solder application at the sides of the contact areas. In the contact area positions, which are close to and remote from the anticipated modulator location, the solder deposited is quantity-limited in that enough solder is applied so that the major masses 23 and 24 advantageously extend to about three-fourths of the height of the modulator 19 as seen in FIG. 1. The latter limiting is achieved by limiting the heating to approximately the solder melting point so that it can be mounded as shown in FIG. 1 without running out over the full extent of contact areas 11 and 12. The resulting solder mound functions as a dam to prevent free running of lower temperature connecting solder masses to be applied later.

In one embodiment in which the modulator 19 had height and width dimensions of approximately 10 mils each for the section shown in FIG. 1, the cross section of the major solder masses 23 and 24 extended out in both directions away from the modulator mounting space 13 about 125 mils. The solder dimensions are not at all critical as long as the total, final solder mass is substantially greater than the mass of the modulator 19. With the dimensions previously noted, and after the addition of low-temperature solder, which will be subsequently described, the total solder-supporting mass and volume are at least one order of magnitude greater than the mass and volume of modulator 19. Once the major solder masses 23 and 24 are in place, the entire structure is then cooled so that similar interface conditions prevail between each of the solder masses 23 and 24 and their respective contact areas 11 and 12.

Modulator 19, with its evaporated contacts 21 and 22, is now placed in the space 13 between contact edges 16 and 17, which are then adjacent to the modulator contacts. In this position the modulator crystal 19 extends somewhat beyond the edges of contact areas 11 and 12, as illustrated in FIG. 3 but only to the extent that crystal 19 is not covered by contacts 21 and 22. Crystal 19 is firmly but temporarily held in this relationship by clamping or spring-loading means not shown. When thus held, crystal 19 is in contact with the tantalum oxide on the glass substrate 10 to the extent allowed by the roughness of the respective surfaces. Since glass is acoustically live, it may be useful in some applications to space crystal 19 from substrate 10 as illustrated for example in FIG. 1A. In the latter case the crystal is supported by removable shims, not shown, which are removed after the assembly has been completed, thereby leaving the crystal supported entirely by the solder masses herein described.

When the crystal is in place in the form shown in either FIG. 1 or FIG. 1A low temperature connecting masses 31 and 32 of solder are run into the spaces between the major solder masses 23 and 24 and the modulator contacts 21 and 22, respectively. This low-temperature solder is the same solder previously used for tinning the contact areas 11 and 12 and is applied while the assembly is heated to a temperature above the 95° C.

melting point of the solder but less than 188° C. The low-temperature solder runs freely at this new temperature. Consequently, the high-temperature solder masses 23 and 24 are undisturbed except for interface alloying with the low-temperature solder. However, the low-temperature solder used for tinning the contact areas 11 and 12 is not remelted at this time because it had previously been absorbed into the solder masses 23 and 24 thereby losing its low-temperature melting characteristic.

During all of the soldering operations, and particularly during the application of the connecting low-temperature masses 31 and 32, the operations are advantageously microscopically monitored to detect voids or foreign material in the solder or on the contact surfaces, or any other imperfections in the solder masses that might allow localized ringing of the modulator in response to the application of an electric field. For example, an attendant using a microscope 34 in FIG. 3 simultaneously observes the interfaces with the modulator and controls the solder application. It has been already noted that minute imperfections in the solder interface can permit localized vibration in the modulator and which is detrimental to high-frequency performance. However, no difficulty was experienced in securing such a degree of perfection in the soldering application when it was microscopically monitored, and possible imperfect conditions were readily detected and corrected before the solder cooled. Upon completion of the application of the connecting solder masses 31 and 32, the entire assembly was once more cooled simultaneously and the total structure cleaned. Crystal 19 is, by the described process, firmly bonded to substrate 10 through the solder-mounting members.

In FIG. 3 a semiconductor driver such as a gallium arsenide crystal 33, which is suitable for operation as a Gunn-effect oscillator, is applied to the contact area portion 18 for supplying high-frequency drive pulses to modulator 19 to test the quality of the assembly and for subsequent modulator operation. Such operation is set forth in detail in the aforementioned King et al. application. A rigid, shaped, coaxial line 36 connects the electrical output of a pulser 37 to the crystal 33. A micromanipulator 38 is provided for positioning the coaxial line 36 so that its center conductor 39 is placed in a pressure contact relationship with the crystal 33. That same conductor 39 is connected to the contact area 11 at the edge of the solder mass 31' by a lead 40 while the outer conductor of the coaxial line 36 is connected by a lead 41 to the contact area 12 at the edge of the solder mass 32'. Thus, the crystal 33 and the modulator 19 are connected in parallel in a drive circuit across the output of pulser 37.

The low-frequency output of the pulser 37 drives the crystal 33 into its Gunn operation mode for coupling the resulting high-frequency pulses to the modulator 19. The output of pulser 37 is used in this embodiment to avoid adverse thermal effects of prolonged bias on the crystal 33. A light beam 44 is provided by input optics 42 for transmission through the modulator 19 and output optics 43 to a suitable detector 46. Input logic 47 supplies binary coded information signals for controlling the operation of crystal 33 in its Gunn-effect mode and correspondingly affecting modulation in crystal 19 as described in the King et al. application. The logic 47 is advantageously included on the substrate in this embodiment.

In one embodiment of the invention which was constructed as outlined herein, a modulator crystal 19 which operated satisfactorily was a lithium tantalate crystal which was 0.5 inch in length and 0.010 inch in width and in height. This modulator was successfully operated at a 2 gigahertz bit rate to produce approximately 20 percent modulation that was readily detectable by the detector 46.

Although the present invention has been described in connection with a particular embodiment thereof, it is to be understood that additional embodiments and modifications which will be obvious to those skilled in the art are included within the spirit and scope of the invention.

What is claimed is:

1. In combination, an electro-optical modulator member of predetermined length dimension for operating on electromagnetic radiation transmitted along said length dimension through said member, a pair of electric contact means adjacent to opposite sides of said member along said length dimension, and means electrically connecting each of said contact means to a different one of said adjacent sides of said member for coupling an electric field through said member, said connecting means comprising acoustically absorbent material electrically and mechanically engaging substantially the full extent of said opposite sides for holding said member in position between said contact means.

2. The combination in accordance with claim 1 in which said connecting means are bonded to said faces and to said contact means.

3. The combination in accordance with claim 1 in which said contact means comprise a substrate with contact areas affixed thereto, and said connecting means support said member away from said substrate by a predetermined amount.

4. The combination in accordance with claim 1 wherein the interfaces between the connecting means and said member are substantially free of imperfections of sufficient magnitude to allow substantial vibration of said member at such an imperfection.

5. The combination in accordance with claim 1 in which said connecting means for each of said contact means is solder.

6. The combination in accordance with claim 1 in which said contact means comprise an acoustically live substrate with metallic contact areas thereon, and said connecting means comprise substantially entirely an acoustically dead material.

7. The combination in accordance with claim 6 in which said material is solder.

8. The combination in accordance with claim 1 in which said connecting means have a total mass which is much greater than the mass of said member.

9. The combination in accordance with claim 8 in which said connecting means have a generally tapering cross-sectional configuration in a direction perpendicular to said length dimension, and said tapering configuration is largest adjacent to said member and tapers to its smallest part remote from said faces.

10. The combination in accordance with claim 1 in which said connecting means comprise a major mass of solder with a melting point of approximately 188° C. deposited on each of said contact means along said length dimension, and a connecting mass of solder having a melting point of approximately 95° C. deposited along said length dimension between said major mass of solder and each of said sides of said modulator and in electrical connection with substantially the full area of such sides.

11. The combination in accordance with claim 10 in which said major mass of solder comprises approximately 50 percent by weight of each of lead and tin, and said connecting mass of solder comprises by weight approximately 16 percent tin, 32 percent lead, and 52 percent bismuth.

12. The combination in accordance with claim 1 in which said contact means comprise a glass substrate, and metallic thin film contact areas deposited on said substrate spaced from one another by an amount to accommodate a width dimension of said member.

13. The combination in accordance with claim 12 in which said metallic thin film contact areas comprise laminated films of tantalum oxide, tantalum nitride, gold, copper, and solder affixed in the order named on said substrate.

14. The combination in accordance with claim 12 in which further contact areas are deposited on said sides of said member and comprise successive thin film laminations of chromium, copper, and gold, and said member is a crystalline material having a C-axis and said sides are those which are perpendicular to the eC-axis of said member.

15. The combination in accordance with claim 12 in which a semiconductor device is mounted on one of said contact areas in electrical contact therewith, said device being characterized by the generation and propagation of high-intensity electric field domains in response to the application of an electric field of predetermined threshold magnitude thereacross, and means including the contact means and the first-mentioned connecting means electrically connecting said semiconductor device in parallel with said member.